United States Patent
Kim et al.

(10) Patent No.: US 11,688,094 B1
(45) Date of Patent: Jun. 27, 2023

(54) METHOD AND SYSTEM FOR MAP TARGET TRACKING

(71) Applicant: VIRNECT inc., Seoul (KR)

(72) Inventors: Ki Young Kim, Seoul (KR); Noh Young Park, Paju-si (KR)

(73) Assignee: VIRNECT INC., Seoul (KR)

( * ) Notice: Subject to any disclaimer, the term of this patent is extended or adjusted under 35 U.S.C. 154(b) by 0 days.

(21) Appl. No.: 18/148,038

(22) Filed: Dec. 29, 2022

(30) Foreign Application Priority Data

Dec. 30, 2021 (KR) .................... 10-2021-0193464

(51) Int. Cl.
| | |
|---|---|
| G06T 7/70 | (2017.01) |
| G06T 17/05 | (2011.01) |
| G06V 10/44 | (2022.01) |
| G06V 10/74 | (2022.01) |
| G06T 7/11 | (2017.01) |

(52) U.S. Cl.
CPC .................. *G06T 7/70* (2017.01); *G06T 7/11* (2017.01); *G06T 17/05* (2013.01); *G06V 10/44* (2022.01); *G06V 10/761* (2022.01); *G06V 2201/07* (2022.01)

(58) Field of Classification Search
CPC .. G06T 7/70; G06T 7/11; G06T 17/05; G06V 10/44; G06V 10/761
See application file for complete search history.

(56) References Cited

U.S. PATENT DOCUMENTS

| | | | | |
|---|---|---|---|---|
| 9,830,452 | B2 * | 11/2017 | Jiang | .................. G06F 21/56 |
| 11,481,925 | B1 * | 10/2022 | Li | .................. G06V 10/7515 |
| 2018/0025235 | A1 * | 1/2018 | Fridman | ................ G06T 7/337 |
| | | | | 382/103 |

(Continued)

FOREIGN PATENT DOCUMENTS

| | | |
|---|---|---|
| JP | 2011043419 A | 3/2011 |
| JP | 2016526313 A | 9/2016 |

(Continued)

OTHER PUBLICATIONS

Jun Wang et al, A Submap Joining Based RGB-D SLAM Algorithm using Planes as Features, Field and Service Robotics, Nov. 3, 2017, pp. 1-14, Centre for Autonomous Systems, University of Technology, Sydney, Australia.

(Continued)

*Primary Examiner* — Mia M Thomas
(74) *Attorney, Agent, or Firm* — STIP Law Group, LLC

(57) ABSTRACT

A method of tracking a map target according to one embodiment of the present disclosure, which tracks the map target through a map target tracking application executed by at least one processor of a terminal, includes: acquiring a basic image obtained by photographing a 3D space; acquiring a plurality of sub-images obtained by dividing the acquired basic image for respective sub-spaces in the 3D space; creating a plurality of sub-maps based on the plurality of acquired sub-images; determining at least one main key frame for each of the plurality of created sub-maps; creating a 3D main map by combining the plurality of sub-maps for which the at least one main key frame is determined; and tracking current posture information in the 3D space based on the created 3D main map.

9 Claims, 8 Drawing Sheets

(56) References Cited

U.S. PATENT DOCUMENTS

| | | | | |
|---|---|---|---|---|
| 2018/0232947 | A1* | 8/2018 | Nehmadi | G01S 7/295 |
| 2019/0088011 | A1* | 3/2019 | Liu | G06T 15/20 |
| 2019/0347820 | A1* | 11/2019 | Golinsky | G06T 7/70 |
| 2019/0371067 | A1* | 12/2019 | Simari | G06T 19/20 |
| 2021/0060787 | A1* | 3/2021 | Qin | G06V 40/172 |
| 2021/0063159 | A1* | 3/2021 | Li | G06T 7/74 |
| 2021/0365701 | A1* | 11/2021 | Eshet | B60W 30/181 |
| 2022/0126117 | A1* | 4/2022 | Voronenko | A61N 5/1084 |
| 2022/0182593 | A1* | 6/2022 | Yin | H04N 13/15 |

FOREIGN PATENT DOCUMENTS

| | | | |
|---|---|---|---|
| KR | 20080029080 | A | 4/2008 |
| KR | 100926783 | B1 | 11/2009 |
| KR | 20150079730 | A | 7/2015 |
| KR | 102014706 | B1 | 8/2019 |
| KR | 20190124515 | A | 11/2019 |
| KR | 20200030508 | A | 3/2020 |
| KR | 102238522 | B1 | 4/2021 |

OTHER PUBLICATIONS

Karl Holmquist, Slamit: A Sub-map based SLAM system On-line creation of multi-leveled map, Master of Science Thesis in Linkoping University, Jan. 17, 2017, pp. 1-54, Linköping University, Linköping, Sweden.

* cited by examiner

[FIG. 1]
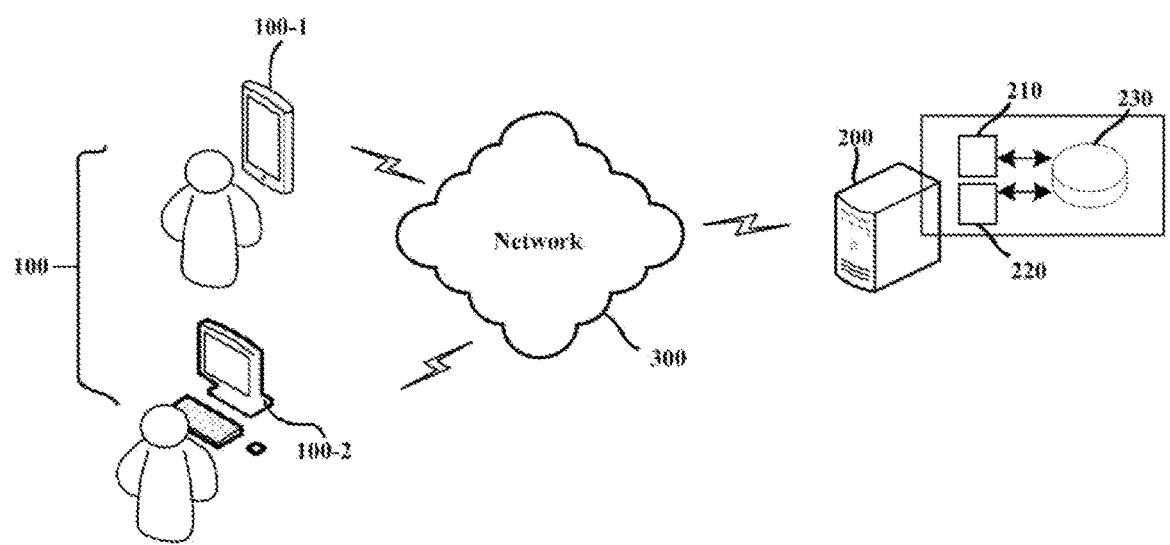

[FIG. 2]
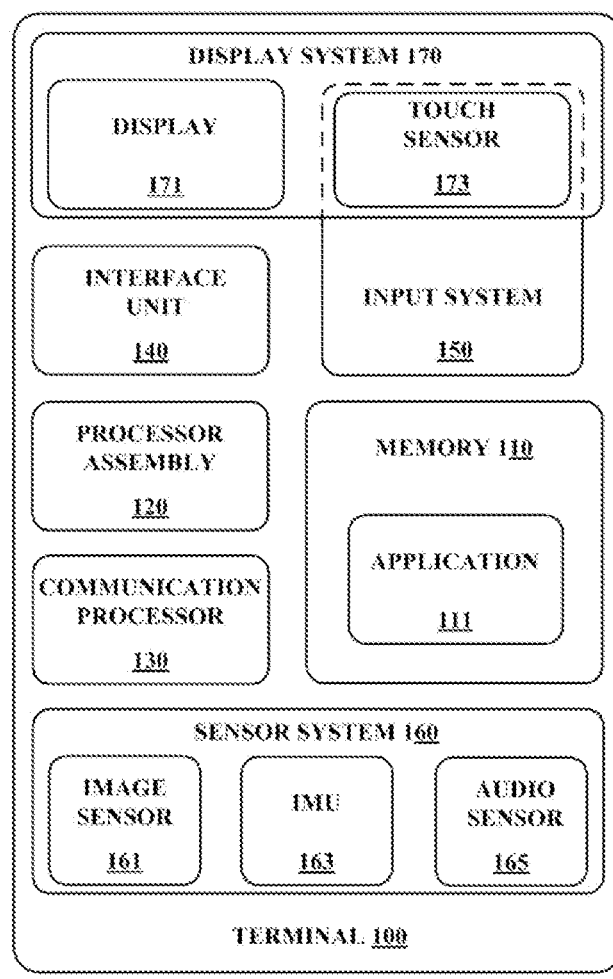

[FIG. 3]
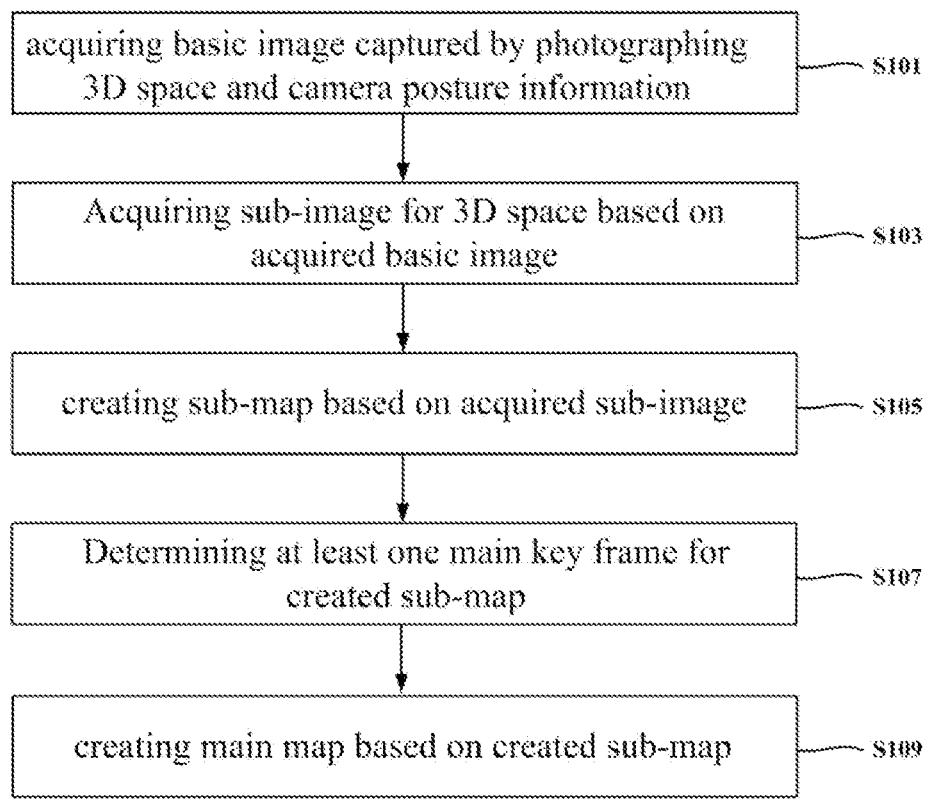

[FIG. 4]
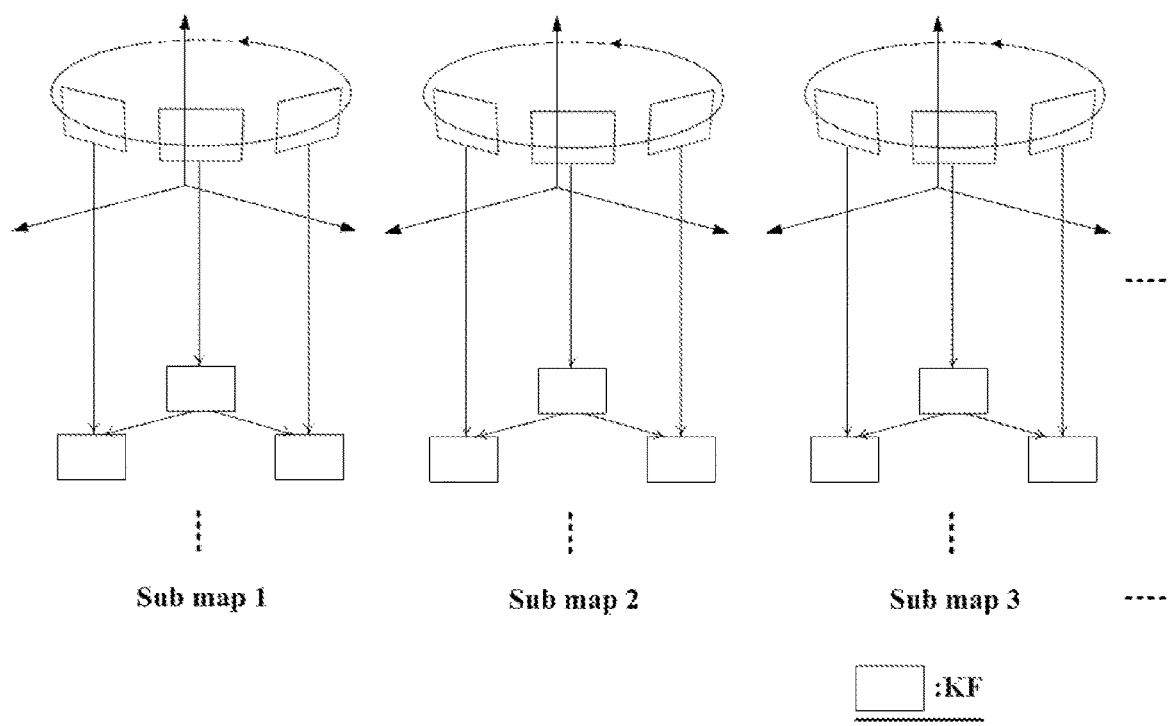

[FIG. 5]
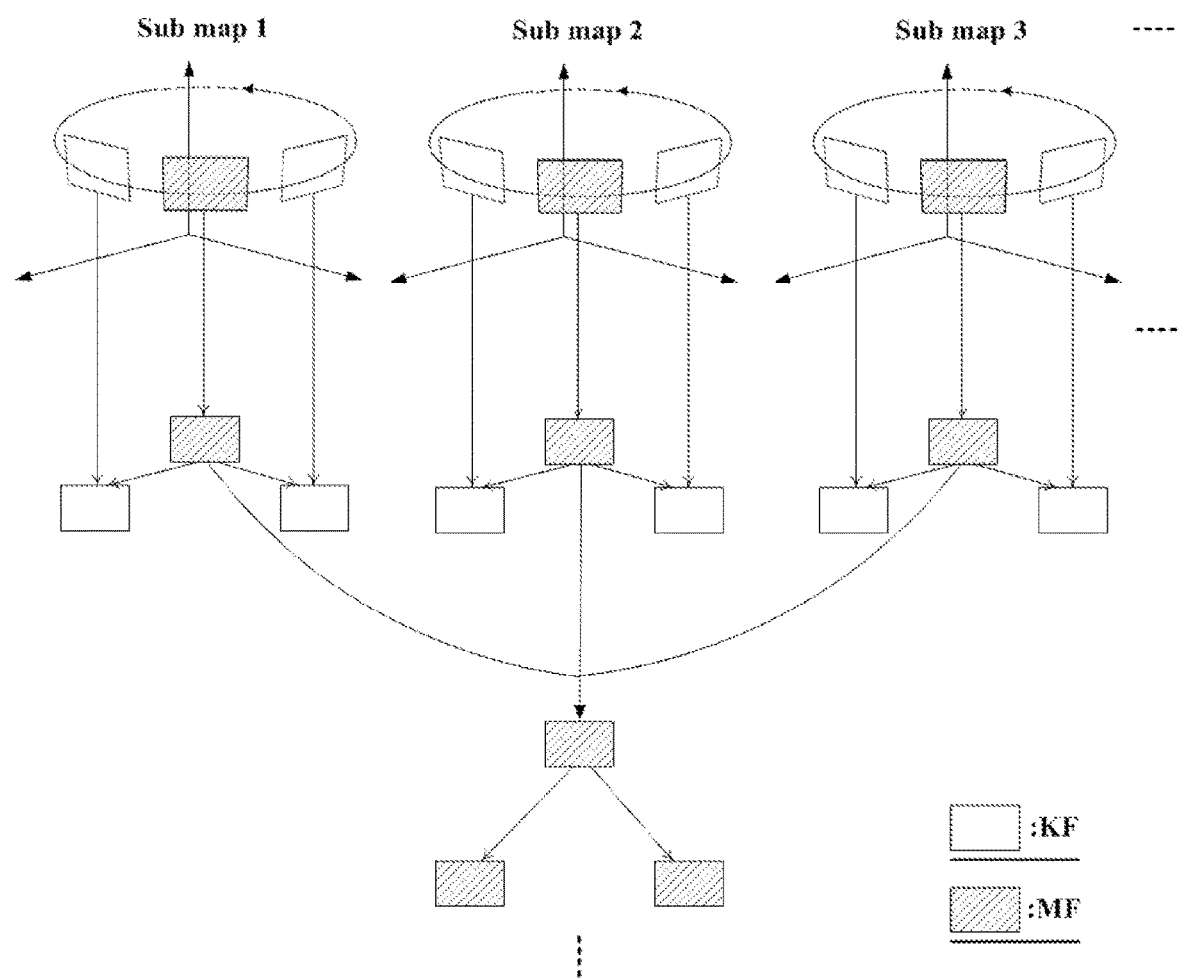

[FIG. 6]
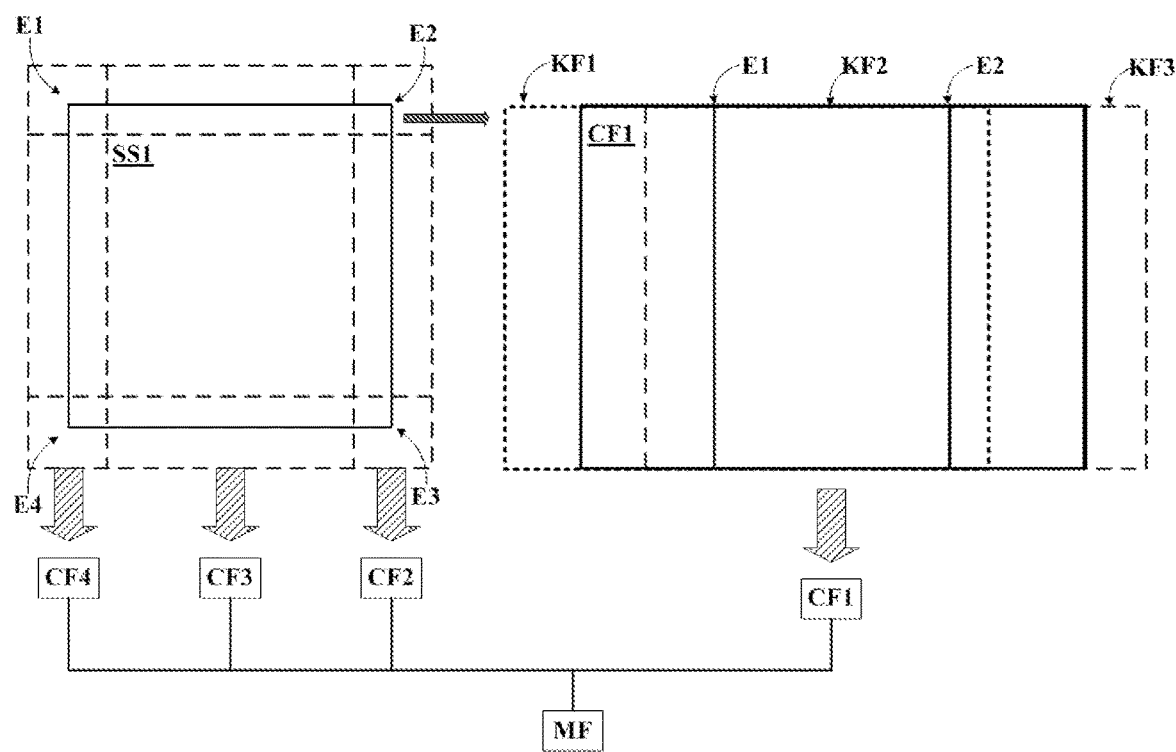

[FIG. 7]
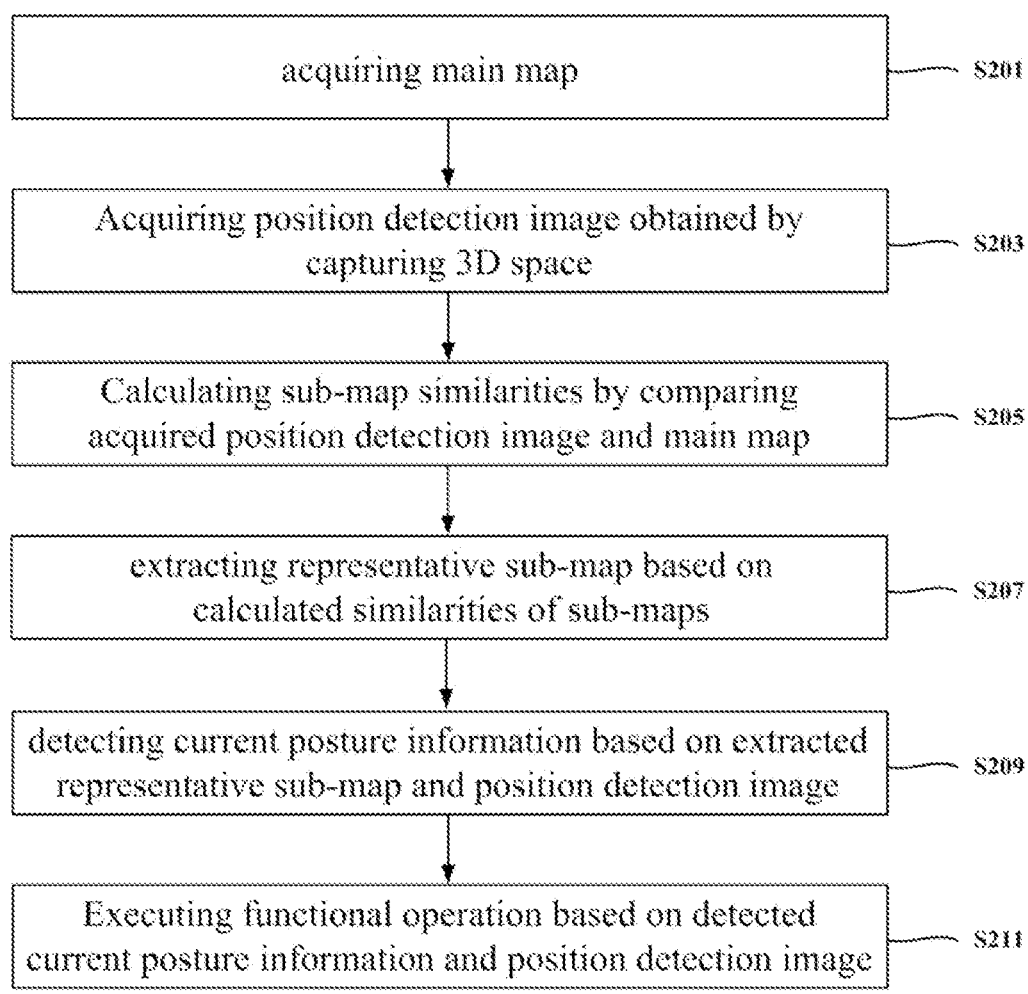

[FIG. 8]
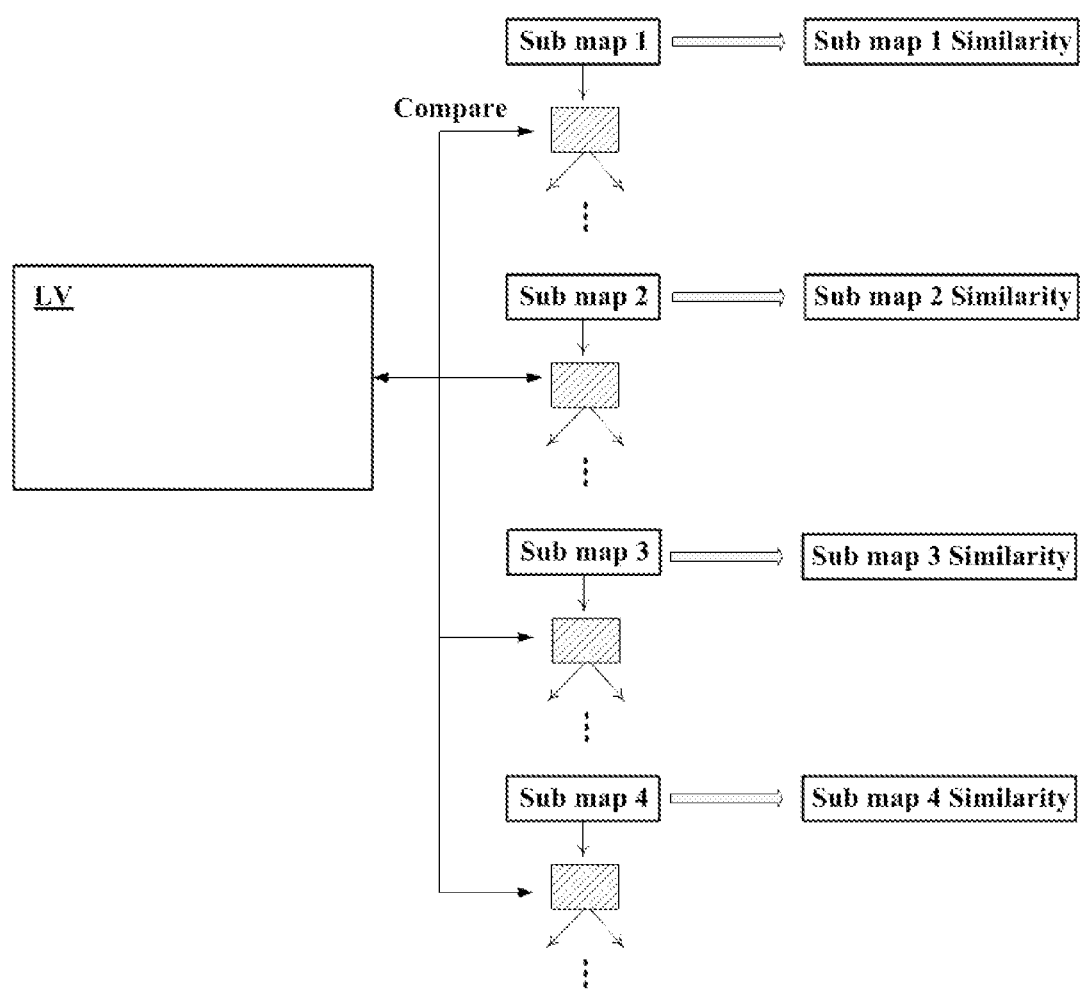

METHOD AND SYSTEM FOR MAP TARGET TRACKING

CROSS-REFERENCE TO RELATED APPLICATIONS

This application claims the benefit of Korean Patent Application No. 10-2021-0193464, filed on Dec. 30, 2021, in the Korean Intellectual Property Office, the entire disclosure of which is incorporated herein by reference for all purposes.

BACKGROUND OF THE INVENTION

Technical Field

The present disclosure relates to a method and system for map target tracking. More specifically, the present disclosure relates to a method and system for map target tracking, which tracks a current posture (position/orientation) in a 3D space based on a 3D map in which the 3D space is divided into a plurality of sub-spaces.

Related Art

Map target, that is, simultaneous localization and mapping (SLAM), technology is a technology that is mainly used for autonomous driving of computing devices such as mobile robots, and a technology that recognizes a location using a surrounding environment map, or through recognition of a location, creates a map of a corresponding area, and performs both location recognition and map creation simultaneously.

A mobile computing device using SLAM technology creates a SLAM map by extracting key frames, landmarks, and the like from an image obtained from a camera.

In addition, such a mobile computing device extracts key frames, landmarks, etc. from an image obtained from a camera when moving in an area for which a SLAM map is created, and recognizes a location thereof by comparing the extracted key frames and landmarks with those in a pre-created SLAM map.

However, conventionally, data processing for performing a comparison operation with all key frames and landmarks included in the pre-created SLAM map is required, which results in significant resources or time required for location tracking using the SLAM map.

Conventionally, there is an attempt to improve processing efficiency by dividing the pre-created SLAM map at predetermined key frame intervals and performing a comparison operation for each divided key frame group, but there is a limit in that due to the separated frames for one continuous space in a 3D space, it is difficult to reach a location recognition in a meaningful spatial unit in the corresponding 3D space.

SUMMARY

The present disclosure provides a map target tracking method and system for tracking a current posture (position/orientation) in a 3D space based on a 3D map that divides the 3D space into a plurality of sub-spaces.

Specifically, the present disclosure provides a map target tracking method and system for generating a 3D map in which a 3D space is divided into a plurality of sub-spaces.

In addition, the present disclosure provides a map target tracking method and system for tracking current posture (position/direction) information based on the 3D map created as above.

Further, the present disclosure provides a map target tracking method and system for executing a predetermined functional operation based on the tracked current posture (position/orientation) information.

However, the objects to be achieved by the present disclosure and the embodiments of the present disclosure are not limited to the objects described above, and other objects may exist.

A map target tracking method according to one embodiment of the present disclosure, which performs a map target tracking through a map target tracking application executed by at least one processor of a terminal, comprises: acquiring a basic image obtained by photographing a 3D space; acquiring a plurality of sub-images obtained by dividing the acquired basic image for respective sub-spaces in the 3D space; creating a plurality of sub-maps based on the plurality of acquired sub-images; determining at least one main key frame for each of the plurality of created sub-maps; creating a 3D main map by combining the plurality of sub-maps for which the at least one main key frame is determined; and tracking current posture information in the 3D space based on the created 3D main map.

In this case, the acquiring of the plurality of sub-images includes partitioning sub-spaces in the 3D space based on a preset space segmentation condition.

Further, the space segmentation condition includes at least one of a condition for detecting a preset spatial division object, a condition for returning to a pre-photographed location, and a condition that a position cluster degree of camera capturing the basic image is less than a predetermined criterion.

In addition, the map target tracking method according to one embodiment of the present disclosure further comprises acquiring camera posture information that provides position and orientation information of a camera at each time when capturing each frame in the basic image, wherein the creating of the plurality of sub-maps includes: extracting at least one key frame for each sub-image; detecting a plurality of feature points for each extracted key frame and a descriptor for each feature point; and creating the plurality of sub-maps by mapping the detected feature points and the detected descriptor for each feature point to 3D space coordinates based on the camera posture information.

Further, the determining of at least one main key frame includes: determining at least some key frames at a predetermined interval among a plurality of key frames for each sub-map as the main key frames of the corresponding sub-map; and/or calculating a similarity between the plurality of key frames for each sub-map and determining at least some key frames having the calculated similarity less than a predetermined criterion as the main key frames of the corresponding sub-map.

Further, the tracking of current posture information in the 3D space based on the created 3D main map includes: acquiring a position detection image obtained by separately photographing the 3D space; calculating a similarity for each sub-map by comparing the acquired position detection image with the 3D main map; determining a sub-map having the highest similarity among the calculated similarities for the respective sub-maps as a representative sub-map; and detecting the current posture information that provides position and orientation information of a camera at each time when capturing each frame in the position detection image by comparing the determined representative sub-map with the position detection image.

Further, the calculating of a similarity for each sub-map includes calculating a similarity between at least one frame of the position detection image and at least one main key frame for each sub-map Further, the detecting of current posture information by comparing the determined representative sub-map with the position detection image includes: extracting a corresponding frame having a predetermined similarity or more with at least one frame of the position detection image, from at least one key frame for the representative sub-map; acquiring camera posture information matched with the extracted corresponding frame; and detecting the current posture information based on the acquired camera posture information.

In addition, the map target tracking method according to one embodiment of the present disclosure further comprises executing a predetermined functional operation based on the detected current posture information, wherein the executing of the predetermined functional operation includes: extracting a key frame having camera posture information corresponding to the current posture information from the representative sub-map; detecting a reference target including at least one of a preset marker, a feature point, and 3D spatial coordinates in the extracted key frame; and executing a functional operation mapped to the detected reference target.

Meanwhile, the map target tracking system according to one embodiment of the present disclosure comprises: at least one display for outputting a 3D main map; at least one memory; at least one processor; and at least one application stored in the memory and executed by the processor to perform the map target tracking, wherein the at least one application is operated to: acquire a basic image obtained by photographing a 3D space; acquire a plurality of sub-images obtained by dividing the acquired basic image for respective sub-spaces in the 3D space; create a plurality of sub-maps based on the plurality of acquired sub-images; determine at least one main key frame for each of the plurality of created sub-maps; create the 3D main map by combining the plurality of sub-maps for which the at least one main key frame is determined; and track current posture information in the 3D space based on the created 3D main map.

In the map target tracking method and system according to one embodiment of the present disclosure, by creating a 3D map in which a 3D space is divided into a plurality of sub-spaces, and tracking a current posture (position/orientation) information based on the created 3D map, it is possible to track the current posture information by performing only a comparison operation for at least some key frames and/or feature points included in each of the divided sub-spaces in the previously created 3D map, which reduces the amount of data processing required for the comparison operation, and saves resources or time required for tracking the current position/orientation.

In addition, in the map target tracking method and system according to one embodiment of the present disclosure, by executing a predetermined functional operation based on the current posture (position/orientation) information tracked through the 3D map as above, it is possible to improve the speed and efficiency of data processing required for executing the corresponding functional operation, which enhances the performance and quality of various application services including the functional operation.

However, the effects obtainable in the present disclosure are not limited to the effects mentioned above, and other effects not mentioned may be clearly understood from the following description.

BRIEF DESCRIPTION OF THE DRAWINGS

FIG. 1 is a conceptual diagram of a map target tracking system according to one embodiment of the present disclosure.

FIG. 2 is an internal block diagram of a terminal according to one embodiment of the present disclosure.

FIG. 3 is a flowchart illustrating a method of creating a 3D map for a map target tracking service according to one embodiment of the present disclosure.

FIG. 4 is an example of a diagram for explaining a sub-map according to one embodiment of the present disclosure.

FIG. 5 is an example of a diagram for explaining a main key frame according to one embodiment of the present disclosure.

FIG. 6 is an example of a diagram for explaining a method of determining a main key frame according to one embodiment of the present disclosure.

FIG. 7 is a flowchart illustrating a method of tracking current posture information based on the 3D map for the map target tracking service according to one embodiment of the present disclosure.

FIG. 8 is an example of a diagram for explaining a method of calculating a plurality of sub-map similarities according to one embodiment of the present disclosure.

DESCRIPTION OF EXEMPLARY EMBODIMENTS

Various modifications may be made to the present disclosure, and the present disclosure may have various embodiments, so specific embodiments of the present disclosure will be illustrated in the drawings and described in detail in the detailed description. Effects and features of the present disclosure, and methods for achieving them will become clear with reference to the embodiments described below in detail together with the drawings. However, the present disclosure is not limited to the embodiments disclosed below and may be implemented in various forms. In the following embodiments, terms such as first and second are used for the purpose of distinguishing one component from another component rather than limiting meaning. Further, the singular expression include plural expressions unless the context clearly indicates otherwise. In addition, terms such as comprise, include or have mean that features or component described in the specification exist, and do not preclude the possibility that one or more other features or components may be added. Furthermore, in the drawings, the size of components may be exaggerated or reduced for convenience of description. For example, since the size and thickness of each component shown in the drawings are arbitrarily shown for convenience of explanation, the present disclosure is not necessarily limited to the illustration.

Hereinafter, embodiments of the present disclosure will be described in detail with reference to the accompanying drawings, and when described with reference to the drawings, the same or corresponding components are given the same reference numerals, and redundant descriptions thereof will be omitted.

FIG. 1 is a conceptual diagram of a map target tracking system according to one embodiment of the present disclosure.

Referring to FIG. 1, a map target tracking system 1000 according to one embodiment of the present disclosure may provide a map target tracking service for tracking a current posture (position/orientation) in a 3D space based on a 3D map in which the 3D space is divided into a plurality of sub-spaces In one embodiment, the map target tracking system 1000, which provides the above map target tracking service, may include a terminal 100, a database server 200, and a network 300.

In this case, the terminal 100, the database server 200 and the robot 500 may be connected through the network 300.

Here, the network 300 according to the embodiment refers to a connection structure capable of exchanging information between nodes such as the terminal 100, and/or the database server 200, and examples of the network 300 include a 3rd generation partnership project (3GPP) network, a long term evolution (LTE) network, a world interoperability for microwave access (WIMAX) network, the Internet, a local area network (LAN), and a wireless local area network (Wireless LAN)), a wide area network (WAN), a personal area network (PAN), a Bluetooth network, a satellite broadcasting network, an analog broadcasting network, a digital multimedia broadcasting (DMB) network, and the like, but are not limited thereto.

Hereinafter, the terminal 100, and the database server 200 implementing the map target tracking system 1000 will be described in detail with reference to the accompanying drawings.

(Terminal 100)

The terminal 100 according to one embodiment of the present disclosure may be a computing device in which a map target tracking application (hereinafter, referred to as application) for providing a map target tracking service is installed.

Specifically, from a hardware point of view, the terminal 100 may include a mobile type computing device 100-1 in which the application is installed.

Here, the mobile type computing device 100-1 may be a mobile device such as a smartphone or a tablet PC in which the application is installed.

For example, the mobile type computing device 100-1 may include a smartphone, a mobile phone, a digital broadcasting device, a personal digital assistant (PDA), a portable multimedia player (PMP), a tablet PC, and the like.

Meanwhile, depending on embodiments, the terminal 100 may include a desktop type computing device 100-2.

In this case, the desktop type computing device 100-2 may include a device in which a program for executing the map target tracking service based on wired/wireless communication is installed, for example, a personal computer, such as a fixed desktop PC, a laptop computer, or an ultrabook, in which the application is installed.

Further, depending on embodiments, the mobile terminal 100 may further include a server computing device that provides a map target tracking service environment.

In addition, depending on embodiments, the terminal 100 may be implemented as at least a part of a robot which provides a map target tracking service environment.

In this case, the robot may mean an intelligent robot that autonomously operates by perceiving the external environment and cognizing the situation by itself.

FIG. 2 is an internal block diagram of the terminal 100 according to one embodiment of the present disclosure.

Referring to FIG. 2, from a functional point of view, the terminal 100 may include a memory 110, a processor assembly 120, a communication processor 130, an interface unit 140, an input system 150, and a sensor system 160, and a display system 170. These components may be configured to be included in a housing of the terminal 100.

Specifically, an application 111 is stored in the memory 110, and the application 111 may store one or more of various application programs, data, and instructions for providing a map target tracking service environment.

That is, the memory 110 may store instructions and data that may be used to create the map target tracking service environment.

Furthermore, the memory 110 may include a program area and a data area.

Here, the program area according to the embodiment may be linked between an operating system (OS) for booting the terminal 100 and functional elements, and the data area may store data generated according to the use of the terminal 100.

In addition, the memory 110 may include at least one non-transitory computer-readable storage medium and a transitory computer-readable storage medium.

For example, the memory 110 may be various storage devices such as ROM, EPROM, flash drive, hard drive, and the like, and may include a web storage that performs the storage function of the memory 110 on the Internet.

The processor assembly 120 may include at least one processor capable of executing instructions of the application 111 stored in the memory 110 to perform various works for creating the map target tracking service environment.

In one embodiment, the processor assembly 120 may control overall operations of components through the application 111 of the memory 110 to provide the map target tracking service.

The processor assembly 120 may be a system on chip (SOC) suitable for the terminal 100 including a central processing unit (CPU) and/or a graphics processing unit (GPU), and may execute the operating system (OS) and/or application programs stored in the memory 110, and control each component mounted to the terminal 100.

In addition, the processor assembly 120 may internally communicate with each component through a system bus, and may include one or more bus structures including a local bus.

Further, the processor assembly 120 may be implemented to include at least one of ASICs (application specific integrated circuits), DSPs (digital signal processors), DSPDs (digital signal processing devices), PLDs (programmable logic devices), FPGAs (field programmable gate arrays), controllers, micro-controllers, microprocessors, and electrical units for performing other functions.

The communication processor 130 may include one or more devices for communicating with an external device. The communication processor 130 may perform communications through a wireless network.

Specifically, the communication processor 130 may communicate with a computing device that stores a content source for implementing the map target tracking service environment, and may communicate with various user input components such as a controller that receives a user input.

In one embodiment, the communication processor 130 may transmit and receive various data related to the map target tracking service to and from another terminal 100, and/or an external server.

The communication processor 130 may wirelessly transmit and receive data to and from at least one of a base station, an external terminal 100, and an arbitrary server on a mobile communication network established through a communication system that can perform technical standards or communication methods for mobile communication (e.g., LTE (Long Term Evolution), LTE-A (Long Term Evolution-Advanced), 5G NR (New Radio), and WIFI), or short-range communication method.

The sensor system 160 may include various sensors such as an image sensor 161, a position sensor (IMU) 163, an audio sensor 165, a distance sensor, a proximity sensor, and a contact sensor.

In this case, the image sensor 161 may capture an image and/or video of a physical space around the terminal 100.

In one embodiment, the image sensor 161 may capture and acquire an image (e.g., a basic image and/or a position detection image) related to the map target tracking service.

In addition, the image sensor 161 may be disposed on a front surface or/and a rear surface of the terminal 100 to capture an image by photographing the side on which the image sensor 161 is disposed, and may photograph the physical space through a camera disposed on the terminal 100 to be directed outward.

The image sensor 161 may include an image sensor device and an image processing module. Specifically, the image sensor 161 may process still images or moving images captured by the image sensor device (e.g., CMOS or CCD).

Further, the image sensor 161 may extract necessary information by processing a still image or moving image acquired through the image sensor device using the image processing module, and transmit the extracted information to the processor.

The image sensor 161 may be a camera assembly including one or more cameras. The camera assembly may include a general camera that captures a visible light band, and may further include a special camera such as an infrared camera, a stereo camera, or the like.

Furthermore, depending on embodiments, the image sensor 161 as described above may be included and operated in the terminal 100, or included in an external device (e.g., an external server, etc.) and operated through interworking with the communication processor 130 and/or the interface unit 140.

The position sensor (IMU) 163 may detect at least one of motion and acceleration of the terminal 100. For example, the position sensor (IMU) 163 may be made of a combination of various position sensors such as an accelerometer, a gyroscope, and a magnetometer.

In addition, the position sensor (IMU) 163 may recognize spatial information about a physical space around the terminal 100 by interworking with a location communication processor 130 such as a GPS of the communication processor 130.

The audio sensor 165 may recognize sounds around the terminal 100.

Specifically, the audio sensor 165 may include a microphone capable of detecting a voice input of a user using the terminal 100.

In one embodiment, the audio sensor 165 may receive voice data required for the map target tracking service from the user.

The interface unit 140 may communicatively connect the terminal 100 with one or more other devices. Specifically, the interface unit 140 may include a wired and/or wireless communication device compatible with one or more different communication protocols.

Through the interface unit 140, the terminal 100 may be connected to various input/output devices.

For example, the interface unit 140 may be connected to an audio output device such as a headset or a speaker to output audio.

Although it has been described that the audio output device is connected to the terminal 100 through the interface unit 140 as an example, the audio output device may be installed in the terminal 100 depending on embodiments.

In addition, for example, the interface unit 140 may be connected to an input device such as a keyboard and/or a mouse to acquire a user input.

Although it has been described that the keyboard and/or the mouse are connected to the terminal 100 through the interface unit 140 as an example, the keyboard and/or the mouse may be installed in the terminal 100 depending on embodiments.

The interface unit 140 may include at least one of a wired/wireless headset port, an external charger port, a wired/wireless data port, a memory card port, a port for connection with a device equipped with an identification module, an audio I/O (input/output) port, a video I/O (input/output) port, an earphone port, a power amplifier, an RF circuit, a transceiver, and other communication circuits.

The input system 150 may detect a user's input (e.g., gestures, voice commands, button manipulations, or other types of input) related to the map target tracking service.

Specifically, the input system 150 may include a button, a touch sensor, and/or an image sensor 161 that receives a user's motion input.

In addition, the input system 150 may be connected to an external controller through the interface unit 140 to receive a user's input.

The display system 170 may output various information related to the map target tracking service as a graphic image.

As an example, the display system 170 may display a basic image, a sub-image, a sub-map, a main map, a position detection image, and/or various user interfaces.

The display system 170 may include at least one of a liquid crystal display (LCD), a thin film transistor-liquid crystal display (TFT LCD), an organic light-emitting diode (OLED), a flexible display, a 3D display, and an electronic ink display (e-ink display).

The above components may be disposed in the housing of the terminal 100, and the user interface may include a touch sensor 173 on the display 171 configured to receive a user's touch input.

Specifically, the display system 170 may include a display 171 for outputting an image, and a touch sensor 173 for detecting a user's touch input.

For example, the display 171 may be implemented as a touch screen in which the display 171 is formed in a layered structure with the touch sensor 173 or integrally with the touch sensor 173. The touch screen may function as a user input unit that provides an input interface between the terminal 100 and the user, and may provide an output interface between the terminal 100 and the user.

Meanwhile, the terminal 100 according to one embodiment of the present disclosure may perform various functional operations required for the map target tracking service using at least one disclosed algorithm.

In one embodiment, the terminal 100 may perform various functional operations required for the map target tracking service based on various algorithms for performing feature point detection and/or calculation of similarity.

As an example, the terminal 100 may perform a functional operation of extracting at least one feature point in an image frame and a descriptor for each feature point based on algorithms such as FastFeatureDetector, MSER, SimpleBlobDetector, and/or GFTTDetector.

In addition, in one embodiment, the terminal 100 may perform a functional operation of measuring similarity between image frames based on a similarity calculation algorithm based on feature matching, histogram, mean square error (MSE), and/or autoencoder.

Further, depending on embodiments, the terminal 100 may further perform at least a part of functional operations performed by the database server 200 to be described later.

(Database Server 200)

Meanwhile, the database server 200 according to one embodiment of the present disclosure may perform a series of processes for providing the map target tracking service.

Specifically, in one embodiment, the database server 200 may provide the map target tracking service by exchanging, with the external device such as the terminal 100, data necessary for driving a map target tracking process in the external device such as the terminal 100.

More specifically, in one embodiment, the database server 200 may provide an environment in which the application 111 can operate in an external device (the terminal 100 in the embodiment).

To this end, the database server 200 may include an application program, data, and/or instructions for operation of the application 111, and may transmit and receive data based thereon to and from the external device.

In addition, in one embodiment, the database server 200 may acquire a basic image obtained by photographing a 3D space, and camera posture information.

In this case, the basic image according to the embodiment may refer to an image captured by a camera (i.e., a computing device including an image sensor) while moving in a 3D space, and the camera posture information may refer to information that provides position/orientation information of the camera when capturing the basic image.

Further, in one embodiment, the database server 200 may acquire a sub-image for the 3D space based on the acquired basic image.

In this case, the sub-image according to the embodiment may refer to an image acquired by dividing the basic image according to each of a plurality of sub-spaces included in the 3D space.

In addition, in one embodiment, the database server 200 may create a sub-map based on the acquired sub-image.

In this case, the sub-map according to the embodiment may mean a 3D map which, based on point cloud information obtained by analyzing at least one key frame in the sub-image, recognizes and provides a 3D space (i.e., sub-space) represented by the corresponding sub-image.

Further, in one embodiment, the database server 200 may determine at least one main key frame for the created sub-map.

Further, in one embodiment, the database server 200 may create a main map based on the created sub-map.

Meanwhile, in one embodiment, the database server 200 may acquire a position detection image obtained by separately photographing the 3D space.

Further, in one embodiment, the database server 200 may compare the acquired position detection image with the above-described main map to calculate a plurality of sub-map similarities.

In this case, the sub-map similarity according to the embodiment may refer to a similarity between at least one frame of the position detection image and at least one main key frame of each sub-map included in the main map.

Further, in one embodiment, the database server 200 may extract a representative sub-map based on the calculated sub-map similarities.

Further, in one embodiment, the database server 200 may detect current posture information based on the extracted representative sub-map and the position detection image.

In this case, the current posture information according to the embodiment may mean position/orientation information of the camera when capturing the position detection image.

In addition, in one embodiment, the database server 200 may execute a functional operation (e.g., an augmented display of a virtual object on the position detection image) based on the detected current posture information and the position detection image.

Further, in one embodiment, the database server 200 may perform a functional operation required for the map target tracking service using at least one disclosed algorithm.

As an example, the database server 200 may perform various functional operations required for the map target tracking service based on various algorithms for performing feature point detection and/or calculation of similarity.

In one embodiment, the database server 200 may perform a functional operation of extracting at least one feature point in an image frame and a descriptor for each feature point based on algorithms such as FastFeatureDetector, MSER, SimpleBlobDetector, and/or GFTTDetector.

In addition, in one embodiment, the database server 200 may perform a functional operation of measuring similarity between image frames based on a similarity calculation algorithm based on feature matching, histogram, mean square error (MSE), and/or autoencoder.

Specifically, in one embodiment, the database server 200 may read an algorithm driving program built to perform the above functional operation from a memory module 230, and may perform a corresponding functional operation according to the read algorithm system.

In this case, depending on embodiments, the above-described algorithm may be directly included in the database server 200 or implemented in a device and/or server separate from the database server 200 to perform a functional operation for the map target tracking service.

In the following description, it is described that the algorithm is included and implemented in the database server 200, but the present disclosure is not limited thereto.

In addition, in one embodiment, the database server 200 may store and manage various application programs, instructions, and/or data for implementing the map target tracking service.

As an example, the database server 200 may store and manage at least one basic image, camera posture information, a sub-image, a sub-map, a key frame, a main key frame, a main map, a position detection image, a sub-map similarity, a representative sub-map, current posture information, and/or various algorithms (in the embodiment, space segmentation algorithm, feature point detection algorithm, similarity calculation algorithm, and/or various functional operation algorithms, etc.) required for the map target tracking service.

Meanwhile, further referring to FIG. 1, in one embodiment, the database server 200 may be implemented as a computing device including at least one processor module 210 for data processing, at least one communication module 220 for data exchange with an external device, and at least one memory module 230 storing various application programs, data and/or instructions for providing the map target tracking service.

In this case, the memory module 230 may store one or more of an operating system (OS), various application programs, data, and instructions for providing the map target tracking service.

Further, the memory module 230 may include a program area and a data area.

In this case, the program area according to one embodiment may be linked between the operating system (OS) for booting the server and functional elements, and the data area may store data generated according to the use of the server.

In one embodiment, the memory module 230 may be a variety of storage devices such as ROM, RAM, EPROM, flash drive, hard drive, and the like, and may be a web storage that performs the storage function of the memory module 230 on the Internet.

Further, the memory module 230 may be a recording medium attachable to and detachable from the server.

Meanwhile, the processor module 210 may control the overall operation of each unit described above to implement the map target tracking service.

The processor module 210 may be a system on chip (SOC) suitable for the server including a central processing unit (CPU) and/or a graphics processing unit (GPU), and may execute the operating system (OS) and/or application programs stored in the memory module 230 and control each component mounted to the server.

In addition, the processor module 210 may internally communicate with each component through a system bus, and may include one or more bus structures including a local bus.

Further, the processor module 210 may be implemented by using at least one of ASICs (application specific integrated circuits), DSPs (digital signal processors), DSPDs (digital signal processing devices), PLDs (programmable logic devices), FPGAs (field programmable gate arrays), controllers, micro-controllers, microprocessors, and electrical units for performing other functions.

In the above description, it has been described that the database server 200 according to one embodiment of the present disclosure performs the functional operations as described above, but depending on embodiments, at least a part of the functional operations performed by the database server 200 may be performed by an external device (e.g., the terminal 100, etc.), or at least a part of the functional operations performed in the external device may be further performed in the database server 200.

(Method of Creating 3D Map for Map Target Tracing Service)

Hereinafter, a method of creating a 3D map for map target tracking service through the application 111 executed by at least one processor of the terminal 100 according to one embodiment of the present disclosure will be described in detail with reference to FIGS. 3 to 6.

In one embodiment of the present disclosure, at least one processor of the terminal 100 may execute at least one application 111 stored in at least one memory 110 or operate in a background state.

Hereinafter, it is briefly described as being performed by the application 111 that the at least one processor operates to execute instructions of the application 111 and perform the method of creating a 3D map for map target tracking service.

FIG. 3 is a flowchart illustrating the method of creating a 3D map for map target tracking service according to one embodiment of the present disclosure.

Referring to FIG. 3, in one embodiment, the application 111 executed by at least one processor of the terminal 100 or operating in a background state may acquire a basic image captured by photographing a 3D space and camera posture information (S101).

In this case, the basic image according to the embodiment may refer to an image captured by a camera (i.e., a computing device including an image sensor) while moving in a 3D space.

In one embodiment, the application 111 may acquire, as the basic image, an image captured by the computing device including the camera (e.g., a terminal and/or robot, etc.) while moving in the 3D space.

In one embodiment, the basic image may include a plurality of frames, and the plurality of frames may be stored and managed in a tree-type data structure, and each of the plurality of frames may be matched with camera posture information at the time when the camera captures the corresponding frame.

In this case, the camera posture information may refer to information that provides position/orientation information of the camera when capturing the basic image.

That is, the camera posture information may be information on the position and orientation of the camera when capturing each frame in the basic image.

In one embodiment, the camera and/or the computing device including the camera may include a sensor (e.g., a gyroscope sensor and/or an acceleration sensor, etc.) for acquiring the above camera posture information, and may match the corresponding camera posture information with each frame in the basic image and provided it to the application 111.

Thus, in one embodiment, the application 111 may acquire the basic image for the 3D space and camera posture information for each frame in the basic image.

In addition, in one embodiment, the application 111 may acquire a sub-image for the 3D space based on the acquired base image (S103).

In this case, the sub-image according to the embodiment may refer to an image acquired by dividing the basic image according to each of a plurality of sub-spaces included in the 3D space.

That is, the sub-image may be an image obtained by capturing each of the plurality of sub-spaces included in the 3D space.

Specifically, in one embodiment, the application 111 may acquire a plurality of sub-images of the 3D space by dividing the base image into a plurality of sub-images according to a preset space segmentation condition.

In detail, the space segmentation condition according to the embodiment may include, as a first space segmentation condition, 1) a case where a predetermined space division object (e.g., a partition, a door, and/or an entrance/exit object, etc.) is detected.

In addition, the spatial division condition may include, as a second space segmentation condition, 2) a case where the camera returns to the previously located photographing position after a predetermined location movement.

That is, the second spatial division condition may include a case where a camera position at which the camera photographed a predetermined first frame in the basic image and a camera position at which the camera photographed a second frame after a predetermined interval from the first frame satisfy a predetermined similarity or higher.

For example, the second space segmentation condition may be a case where the camera starts from an entrance position of a first sub-space in the 3D space and returns back to the entrance position of the first sub-space after moving in the first sub-space.

In addition, the spatial division condition may include, as a third space segmentation condition, 3) a case where a cluster degree of camera positions for respective frames in the base image is less than a predetermined criterion.

Specifically, the third space segmentation condition may include a case the cluster degree of camera positions satisfies the predetermined criterion while the camera captures at least some frames in the basic image, and then the cluster degree of camera positions does not satisfy the predetermined criterion from a specific frame.

For example, the third spatial division condition may be a case where the camera position cluster degree in a plurality of frames photographing the first sub-space in the 3D space satisfies the predetermined criterion, and then the corresponding camera position cluster degree decreases below the predetermined criterion when the camera moves to another sub-space after exiting the first sub-space.

That is, in one embodiment, when at least one of the space segmentation conditions is satisfied, the application 111 may divide the base image into a plurality of sub-images based on an image point that satisfies the corresponding condition.

Thus, the application 111 may acquire a plurality of sub-images according to the preset space segmentation condition.

Accordingly, the application 111 can classify and detect substantially meaningfully divided spaces within the corresponding 3D space with high accuracy according to a systematic criterion.

In addition, in one embodiment, the application 111 may create a sub-map based on the acquired sub-image (S105).

In this case, the sub-map according to the embodiment may refer to a 3D map which, based on point cloud data obtained by analyzing at least one key frame in the sub-image, recognizes and provides a 3D space (i.e., sub-space) represented by the corresponding sub-image.

Specifically, in one embodiment, the application 111 may create a sub-map for each of the acquired plurality of sub-images.

FIG. 4 is an example of a diagram for explaining the sub-map according to one embodiment of the present disclosure.

More specifically, referring to FIG. 4, in one embodiment, among all the frames constituting the sub-image, the application 111 may extract at least one key frame according to a predetermined criterion (e.g., predetermined interval and/or predetermined change detection, etc.).

In this case, the at least one key frame KF may be stored and managed in a tree-type data structure.

In addition, in one embodiment, the application 111 may detect a plurality of feature points in the key frame KF in conjunction with a feature detector.

For reference, the feature point may be a point capable of specifying a shape such as an edge or a corner of an object, and may also be a point capable of specifying a line extracted from the contour of a closed region.

For example, the feature point may be obtained by extracting a line or point from circular or rectangular outline of light, etc., in a ceiling image obtained by photographing an indoor ceiling.

That is, the feature detector according to the embodiment may detect a feature (e.g., edge and/or corner) point in the key frame KF as the feature point.

In this case, the feature detector may calculate a descriptor capable of specifying each of the detected feature points for each of the feature points together.

For reference, the descriptor is information for specifying each feature point, and may be obtained by dividing pixels around the corresponding feature point into blocks of a certain size and calculating a gradient histogram of pixels belonging to each block. The descriptor may mainly include 3D space coordinate information (in the embodiment, normal vector and/or 6 degrees of freedom (6 DoF), etc.), and information such as brightness, color, direction, and/or size around the feature point.

The feature detector may be implemented based on algorithms such as FastFeatureDetector, MSER, SimpleBlobDetector, and/or GFTTDetector, for example. However, these are only an example and the present disclosure is not limited thereto.

In this case, in one embodiment, the application 111 may store and manage the detected feature points by matching the feature points with the respective descriptors for them.

In addition, in one embodiment, the application 111 may create a sub-map for the sub-image by mapping the plurality of detected feature points onto 3D spatial coordinates.

Specifically, the application 111 may create a sub-map according to the 3D spatial coordinates by mapping each of the plurality of feature points (and/or the descriptor for each of the plurality of feature points) detected from the key frames KF in the sub-image with camera posture information (i.e., camera position/orientation information) at the time when the camera acquires the corresponding key frame KF.

That is, in the embodiment, the application 111 may detect a plurality of feature points (i.e., point clouds) from at least one key frame KF in each sub-image, and create a sub-map for each sub-image by mapping the detected feature points (and/or the descriptors for the respective feature points) onto 3D space coordinates according to the camera posture information at the time when the camera captures the corresponding key frame KF.

Accordingly, the application 111 can implement a 3D map for a 3D space by partitioning the corresponding 3D space into sub-spaces divided in the 3D space.

Further, in one embodiment, the application 111 may determine at least one main key frame for the created sub-map (S107).

FIG. 5 is an example of a diagram for explaining the main key frame according to one embodiment of the present disclosure.

Specifically, referring to FIG. 5, in one embodiment, the application 111 may determine at least a part of the plurality of key frames KF included in each of the created sub-maps as a main key frame MF for each sub-map.

More specifically, in one embodiment, the application 111 may 1) determine at least one main key frame MF for each sub-map at a preset interval.

In detail, the application 111 may select and extract at least some of a plurality of key frames KF included in each sub-map according to the preset interval.

In addition, the application 111 may determine the extracted at least some key frames KF as at least one main key frame MF for the corresponding sub-map.

In another embodiment, the application 111 may 2) determine at least one main key frame MF for each sub-map based on a similarity between a plurality of key frames KF in each sub-map.

Specifically, the application 111 may calculate a similarity between a plurality of key frames KF included in each of the sub-maps.

As an example, the application 111 may calculate a similarity between the plurality of key frames KF in each sub-map based on the disclosed similarity calculation algorithm (e.g., a similarity calculation algorithm based on feature matching, histogram, MSE (mean square error) and/or autoencoder)

In addition, the application 111 may detect at least some key frames KF whose calculated similarities are less than a predetermined criterion (i.e., key frames KF with a large similarity change).

Further, the application 111 may determine the detected at least some key frames KF as at least one main key frame MF for the corresponding sub-map.

In another embodiment, the application 111 may 3) determine at least one main key frame MF for each sub-map based on the edges detected in a plurality of key frames KF in each sub-map Specifically, the application 111 may detect at least two or more tangents (edges) between walls forming a corresponding sub-space based on a plurality of feature points included in a plurality of key frames KF in each sub-map.

FIG. 6 is an example of a diagram for explaining a method of determining a main key frame according to one embodiment of the present disclosure.

For example, referring to FIG. 6, when first to fourth wall surfaces (i.e., side surfaces) form a first sub-space SS1, the application 111 may detect a first edge E1 which is a tangent between the first wall surface and the second wall surface, a second edge E2 which is a tangent between the second wall surface and the third wall surface, and a third edge E3 which is a tangent between the third wall surface and the fourth wall surface, a fourth edge E4 which is a tangent between the fourth wall surface and the first wall surface.

Further, the application 111 may group the detected at least two tangents (edges) into a pair of two adjacent tangents.

For example, the application 111 may group the first edge E1 and the second edge E2 as a pair, the second edge E2 and the third edge E3 as a pair, the third edge E3 and the fourth edge E4 as a pair, and the fourth edge E4 and the first edge E1 as a pair.

In addition, for each tangent group, the application 111 may extract at least one key frame KF including all two tangents (edges) in the tangent group.

In addition, the application 111 may detect, among the extracted at least one key frame KF, a key frame KF in which the center point between two corresponding tangents (edges) is located in a central area of the corresponding key frame KF.

That is, the application 111 may detect a key frame CF (hereinafter, referred to as center key frame) that is the center between two corresponding tangent (edges) for each tangent group.

In addition, the application 111 may determine a center key frame CF detected for each tangent group as at least one main key frame MF for the corresponding sub-map.

In this case, the at least one main key frame MF may be stored and managed in a tree-type data structure.

In the above, the embodiments have been separately described for effective explanation, but at least some of the embodiments may be organically combined and operated depending on embodiments.

Accordingly, when processing various types of data based on the corresponding sub-map, the application 111 enables calculation using at least some frames representing the entire frame instead of calculating all frames included in the corresponding sub-map, thereby reducing the amount of calculation and improving the speed of calculation to improve the efficiency of data processing. Accordingly, data processing at the time of detecting current position information for a later map target tracking service can be operated more efficiently.

In addition, in one embodiment, the application 111 may create a main map based on the created sub-map (S109).

Specifically, in one embodiment, the application 111 may create the main map by combining a plurality of sub-maps in which at least one main key frame MF is determined as described above.

Further, in one embodiment, the application 111 may provide the created main map to an external computing device (in the embodiment, another terminal and/or the database server).

Accordingly, the application 111 may cause the map target tracking service according to one embodiment of the present disclosure to be implemented using the 3D map (i.e., the main map in the embodiment) including a plurality of sub-maps created for the respective sub-spaces in the 3D space (A Method of Tracking Current Posture Information Based on 3D Map for Map Target Tracking Service)

Hereinafter, a method of tracking current posture information based on the 3D map for the map target tracking service according to one embodiment of the present disclosure through the application 111 according to one embodiment will be described in detail with reference to the accompanying drawings. In this case, redundant description with the above description may be summarized or omitted.

FIG. 7 is a flowchart illustrating a method of tracking current posture information based on the 3D map for the map target tracking service according to one embodiment of the present disclosure.

Referring to FIG. 7, in one embodiment, the application 111 may acquire a main map (S201).

Specifically, in one embodiment, the application 111 may acquire a 3D main map in which a plurality of sub-maps are combined as described above by creating the main map by itself and/or receiving the main map from an external computing device (in the embodiment, another terminal and/or the database server, etc.).

In addition, in one embodiment, the application 111 may acquire a position detection image obtained by capturing a 3D space (S203).

In this case, the position detection image according to the embodiment may refer to an image captured by a terminal (and/or robot) including the main map and a camera (i.e., a computing device including an image sensor) while moving in the 3D space.

In one embodiment, the position detection image may include a plurality of frames, and the plurality of frames may be stored and managed in a tree-type data structure.

In one embodiment, the terminal (and/or robot) including the main map and the camera may acquire the position detection image by separately photographing the 3D space based on the camera, and provide the acquired position detection image to the application 111.

Accordingly, in one embodiment, the application 111 may acquire the position detection image for the 3D space.

Further, in one embodiment, the application 111 may calculate a plurality of sub-map similarities by comparing the acquired position detection image and the main map (S205).

FIG. 8 is an example of a diagram for explaining a method of calculating the plurality of sub-map similarities according to one embodiment of the present disclosure.

Referring to FIG. 8, in one embodiment, the application 111 may calculate a sub-map similarity for each of the plurality of sub-maps by comparing the acquired position detection image LV with each of the plurality of sub-maps included in the main map.

In this case, the sub-map similarity according to the embodiment may refer to a degree of similarity between at least one frame of the position detection image LV (hereinafter, referred to as position detection frame) and at least one main key frame MF of each of the sub-maps included in the main map.

Specifically, in one embodiment, the application 111 may calculate a sub-map similarity for each of the plurality of sub-maps by comparing the at least one position detection frame and the at least one main key frame MF for each of the plurality of sub-maps.

In this case, since at least one main key frame MF for each of the plurality of sub-maps may be data structured in a single tree form and compared with the at least one position detection frame, the efficiency of data processing can be improved compared to comparing all key frames KF included in the plurality of sub-maps with the at least one position detection frame one by one.

As an example, the application 111 may calculate a similarity between at least one frame of the position detection image LV and at least one main key frame MF for each sub-map based on the disclosed similarity calculation algorithm (e.g., a similarity calculation algorithm based on feature matching, histogram, MSE (mean square error) and/or autoencoder).

In this case, in one embodiment, the application 111 may perform data calculation for similarity calculation for each sub-map in the main map in parallel for all of the plurality of sub-maps.

That is, by performing a parallel operation based on sample data based on main key frames MF in the pre-built 3D main map and the plurality of sub-maps to calculate a similarity for each sub-map, the application 111 can easily extract a sub-map having the highest similarity with the corresponding position detection image (LV) even with a small amount of computation. Through this, when tracking the current location/orientation using the pre-built 3D map, the application 111 uses only the extracted sub-maps (i.e., partial maps) that are determined to be most similar, thereby further reducing data processing amount and resources required for the corresponding calculations, and at the same time increasing speed of the calculation, which results in improved efficiency.

Further, in one embodiment, the application 111 may extract a representative sub-map based on the calculated similarities of the plurality of sub-maps (S207).

In this case, the representative sub-map according to the embodiment may mean a sub-map having the highest similarity among the plurality of sub-map similarities.

That is, in one embodiment, the application 111 may detect a sub-map having the highest similarity among the plurality of sub-map similarities calculated as above.

Then, the application 111 may extract the detected sub-map from the main map as the representative sub-map.

Further, in one embodiment, the application 111 may detect current posture information based on the extracted representative sub-map and the position detection image LV (S209).

In this case, the current posture information according to the embodiment may mean position/orientation information of the camera when capturing the position detection image LV.

That is, the current posture information may include information on the position and orientation of the camera when capturing each frame in the position detection image LV.

Specifically, in one embodiment, the application 111 may compare at least one key frame KF included in the extracted representative sub-map with at least one position detection frame of the position detection image LV.

In addition, in one embodiment, the application 111 may extract at least one key frame KF (hereinafter, referred to as corresponding frame) having a predetermined similarity or higher with the position detection frame from the sub-map.

In this case, as an example, the application 111 may calculate the similarity based on the disclosed similarity calculation algorithm (e.g., similarity calculation algorithm based on feature matching, histogram, MSE (mean square error) and/or autoencoder).

In addition, in one embodiment, the application 111 may read camera posture information matched to the extracted corresponding frame from the memory 110.

Further, in one embodiment, the application 111 may detect the current posture information based on the read camera posture information.

In this way, by partially extracting only the sub-map of the sub-space determined to be most similar to the space in which the position detection image LV is captured in the main map representing the entire 3D space, and based on this, detecting the current posture information in the 3D space (i.e., the position/orientation information when the position detection image LV is captured), the application 111 can easily detect the current posture information using only the partial 3D map (i.e., the representative sub-maps in the embodiment) extracted through efficient calculation without comparing the entire 3D map of the corresponding 3D space (i.e., the main map in the embodiment) while looking around the entire 3D map, so that it is possible to implement the efficiently operating map target tracking service that reduces the data processing amount and resources required for the map target tracking service for tracking the current position/orientation in 3D space and improves the data processing speed.

Further, in one embodiment, the application 111 may execute a functional operation based on the detected current posture information and the position detection image LV (S211).

Specifically, in one embodiment, the application 111 may extract a key frame (hereinafter, a target frame) having camera posture information corresponding to the detected current posture information from the representative sub-map.

In addition, in one embodiment, the application 111 may detect a functional operation mapped to a predetermined reference target (e.g., a feature point, a preset marker, and/or 3D spatial coordinates) included in the extracted target frame.

As an example, the functional operation may be a function of augmenting and displaying a predetermined virtual object with respect to the mapped reference target and/or a function of designating a waypoint.

Further, in one embodiment, the application 111 may execute the detected functional operation based on the position detection image LV.

For example, the application 111 may augment and display a specific virtual object with respect to a predetermined reference target in the position detection image LV, or designate the reference target as a specific waypoint.

In this way, the application 111 can enable various functional operations required in a specific sub-space to be performed quickly with a small data processing amount using a 3D map (i.e., the main map in the embodiment) in a form that each of a plurality of sub-spaces in the 3D space can be distinguished, and can improve performance and quality of various application services including these functional operations.

As described above, in the map target tracking method and system according to one embodiment of the present disclosure, by creating a 3D map in which a 3D space is divided into a plurality of sub-spaces, and tracking a current posture (position/orientation) information based on the created 3D map, it is possible to track the current posture information by performing only a comparison operation for at least some key frames and/or feature points included in each of the divided sub-spaces in the previously created 3D map, which reduces the amount of data processing required for the comparison operation, and saves resources or time required for tracking the current position/orientation.

In addition, in the map target tracking method and system according to one embodiment of the present disclosure, by executing a predetermined functional operation based on the current posture (position/orientation) information tracked through the 3D map as above, it is possible to improve the speed and efficiency of data processing required for executing the corresponding functional operation, which enhances the performance and quality of various application services including the functional operation.

Meanwhile, the embodiments according to the present disclosure described above may be implemented in the form of program instructions that can be executed through various computer components, and may be recorded on a computer-readable recording medium. The computer-readable recording medium may include program instructions, data files, data structures, etc. alone or in combination. The program instructions recorded on the computer-readable recording medium may be specially designed and configured for the present disclosure, or may be known and available to those skilled in the art of computer software. Examples of the computer-readable recording medium include a hard disk, a floppy disk, a magnetic medium such as a magnetic tape, an optical recording medium such as CD-ROM and DVD, a magneto-optical medium such as a floptical disk, and hardware devices specially configured to store and execute program instructions, such as ROM, RAM, flash memory, and the like. Examples of the program instructions include not only machine language codes generated by a compiler, but also high-level language codes that can be executed by a computer using an interpreter or the like. The hardware device may be modified to one or more software modules to perform processing according to the present disclosure, and vice versa.

Specific implementations described in the present disclosure are examples, and do not limit the scope of the present disclosure in any way. For conciseness of the specification, description of conventional electronic components, control systems, software, and other functional aspects of the systems may be omitted. In addition, the connection of lines or connecting members between the components shown in the drawings represent functional connections and/or physical or circuit connections by way of example, and in actual devices, may be represented by various functional connections, physical connections, or circuit connections, which are replaceable or additional. Further, if a component is described without specific expression such as "essential" or "important", it may not be a component necessarily required for the application of the present disclosure.

In addition, the detailed description of the present disclosure has been described with reference to preferred embodiments of the present disclosure, it will be understood by those skilled in the art or those having ordinary knowledge in the art that the present disclosure may be variously modified and changed without departing from the spirit and the technical scope of the present disclosure described in the claims to be described later. Therefore, the technical scope of the present disclosure is not limited to the contents described in the detailed description of the specification, but should be defined by the claims.

What is claimed is:

1. A method of tracking a map target through a map target tracking application executed by at least one processor of a terminal, the method comprising:
   acquiring a basic image obtained by photographing a 3D space;
   acquiring a plurality of sub-images obtained by dividing the acquired basic image for respective sub-spaces in the 3D space;
   creating a plurality of sub-maps based on the plurality of acquired sub-images;
   determining at least one main key frame for each of the plurality of created sub-maps;
   creating a 3D main map by combining the plurality of sub-maps for which the at least one main key frame is determined;
   tracking current posture information in the 3D space based on the created 3D main map; and
   acquiring camera posture information that provides position and orientation information of a camera at each time when capturing each frame in the basic image,
   wherein the creating of the plurality of sub-maps includes:
   extracting at least one key frame for each sub-image;
   detecting a plurality of feature points for each extracted key frame and a descriptor for each feature point; and
   creating the plurality of sub-maps by mapping the detected feature points and the detected descriptor for each feature point to 3D space coordinates based on the camera posture information.

2. The method of claim 1, wherein the acquiring of the plurality of sub-images includes partitioning sub-spaces in the 3D space based on a preset space segmentation condition.

3. The method of claim 2, wherein the space segmentation condition includes at least one of a condition for detecting a preset spatial division object, a condition for returning to a pre-photographed location, and a condition that a position cluster degree of a camera capturing the basic image less than a predetermined criterion.

4. A method of tracking a map target through a map target tracking application executed by at least one processor of a terminal, the method comprising:
   acquiring a basic image obtained by photographing a 3D space;
   acquiring a plurality of sub-images obtained by dividing the acquired basic image for respective sub-spaces in the 3D space;
   creating a plurality of sub-maps based on the plurality of acquired sub-images;
   determining at least one main key frame for each of the plurality of created sub-maps;
   creating a 3D main map by combining the plurality of sub-maps for which the at least one main key frame is determined; and tracking current posture information in the 3D space based on the created 3D main map, wherein the determining of at least one main key frame includes at least one of:

determining at least some key frames at a predetermined interval among a plurality of key frames for each sub-map as the main key frames of the corresponding sub-map; and calculating a similarity between the plurality of key frames for each sub-map and determining at least some key frames having the calculated similarity less than a predetermined criterion as the main key frames of the corresponding sub-map.

5. A method of tracking a map target through a map target tracking application executed by at least one processor of a terminal, the method comprising:

acquiring a basic image obtained by photographing a 3D space;

acquiring a plurality of sub-images obtained by dividing the acquired basic image for respective sub-spaces in the 3D space;

creating a plurality of sub-maps based on the plurality of acquired sub-images;

determining at least one main key frame for each of the plurality of created sub-maps;

creating a 3D main map by combining the plurality of sub-maps for which the at least one main key frame is determined; and tracking current posture information in the 3D space based on the created 3D main map, wherein the tracking of current posture information in the 3D space based on the created 3D main map includes:

acquiring a position detection image obtained by separately photographing the 3D space;

calculating a similarity for each sub-map by comparing the acquired position detection image with the 3D main map;

determining a sub-map having the highest similarity among the calculated similarities for the respective sub-maps as a representative sub-map; and detecting the current posture information that provides position and orientation information of a camera at each time when capturing each frame in the position detection image by comparing the determined representative sub-map with the position detection image.

6. The method of claim 5, wherein the calculating of a similarity for each sub-map includes calculating a similarity between at least one frame of the position detection image and at least one main key frame for each sub-map.

7. The method of claim 5, wherein the detecting of current posture information by comparing the determined representative sub-map with the position detection image includes:

extracting a corresponding frame having a predetermined similarity or greater with at least one frame of the position detection image, from at least one key frame for the representative sub-map;

acquiring camera posture information matched with the extracted corresponding frame; and detecting the current posture information based on the acquired camera posture information.

8. The method of claim 5, further comprising:

executing a predetermined functional operation based on the detected current posture information, wherein the executing of the predetermined functional operation includes:

extracting a key frame having camera posture information corresponding to the current posture information from the representative sub-map;

detecting a reference target including at least one of a preset marker, a feature point, and 3D spatial coordinates in the extracted key frame; and executing a functional operation mapped to the detected reference target.

9. A system for tracking a map target, the system comprising:

at least one display for outputting a 3D main map;

at least one memory;

at least one processor; and at least one application stored in the memory and executed by the processor to perform the map target tracking, wherein the at least one application is operated to:

acquire a basic image obtained by photographing a 3D space;

acquire a plurality of sub-images obtained by dividing the acquired basic image for respective sub-spaces in the 3D space;

create a plurality of sub-maps based on the plurality of acquired sub-images;

determine at least one main key frame for each of the plurality of created sub-maps;

create the 3D main map by combining the plurality of sub-maps for which the at least one main key frame is determined;

track current posture information in the 3D space based on the created 3D main map; and acquire camera posture information that provides position and orientation information of a camera when capturing each frame in the basic image;

extract at least one key frame for each sub-image;

detect a plurality of feature points for each extracted key frame and a descriptor for each feature point; and create the plurality of sub-maps by mapping the detected feature points and the detected descriptor for each feature point to 3D space coordinates based on the camera posture information.

* * * * *